(12) United States Patent
Kato et al.

(10) Patent No.: US 10,774,795 B2
(45) Date of Patent: Sep. 15, 2020

(54) VALVE DEVICE

(71) Applicant: Mitsubishi Electric Corporation, Tokyo (JP)

(72) Inventors: Tomokuni Kato, Tokyo (JP); Atsushi Morimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/075,266

(22) PCT Filed: Mar. 9, 2016

(86) PCT No.: PCT/JP2016/057395
§ 371 (c)(1),
(2) Date: Aug. 3, 2018

(87) PCT Pub. No.: WO2017/154139
PCT Pub. Date: Sep. 14, 2017

(65) Prior Publication Data
US 2019/0085796 A1 Mar. 21, 2019

(51) Int. Cl.
*F02M 26/70* (2016.01)
*F16K 31/04* (2006.01)
(Continued)

(52) U.S. Cl.
CPC ............ *F02M 26/70* (2016.02); *F02M 26/54* (2016.02); *F02M 26/72* (2016.02); *F16K 31/04* (2013.01); *F02D 41/005* (2013.01); *F02D 41/0077* (2013.01); *F02D 2200/0414* (2013.01); *F02M 26/53* (2016.02); *F02M 26/73* (2016.02); *F02M 2026/004* (2016.02)

(58) Field of Classification Search
CPC ........ F02M 26/70; F02M 26/54; F02M 26/72; F02M 26/53; F02M 26/73; F02M 2026/004; F02D 41/0077; F02D 41/005; F02D 2200/0414
USPC ...................................... 318/432; 123/568.21
See application file for complete search history.

(56) References Cited

U.S. PATENT DOCUMENTS 4,420,185 A * 12/1983 Bienert .................. B60J 7/0573
296/223
4,702,210 A * 10/1987 Yasuoka ............... F02D 31/005
123/179.16
(Continued)

FOREIGN PATENT DOCUMENTS

CA       2887439 C  *  4/2014  ....... H01L 31/02327
EP       0221670 A1 *  5/1987  ............. G05B 11/18
(Continued)

OTHER PUBLICATIONS

International Search Report (PCT/ISA/210) issued in PCT/JP2016/057395 dated Jun. 14, 2016.

*Primary Examiner* — Mahmoud Gimie
*Assistant Examiner* — Joshua Campbell
(74) *Attorney, Agent, or Firm* — Birch, Stewart, Kolasch & Birch, LLP

(57) ABSTRACT

In a valve device (1), when a valve (33) is closed, an output shaft of an actuator unit (10) is connected to the valve (33). A control unit of the valve device (1) determines a control constant to be a value by which a response speed of the actuator unit (10) is smaller as ambient temperature is higher, and performs feedback control.

5 Claims, 3 Drawing Sheets

(51) Int. Cl.
*F02M 26/54* (2016.01)
*F02M 26/72* (2016.01)
F02M 26/00 (2016.01)
F02M 26/73 (2016.01)
F02D 41/00 (2006.01)
F02M 26/53 (2016.01)

(56) References Cited

U.S. PATENT DOCUMENTS

| | | | | |
|---|---|---|---|---|
| 4,887,570 | A * | 12/1989 | Meicher | F02D 31/005 |
| | | | | 123/339.15 |
| 5,531,205 | A * | 7/1996 | Cook | F02D 9/101 |
| | | | | 123/568.24 |
| 2002/0067149 | A1 | 6/2002 | Moeller et al. | |
| 2005/0027428 | A1* | 2/2005 | Glora | F02D 31/009 |
| | | | | 701/93 |
| 2007/0182694 | A1* | 8/2007 | Lee | G09G 3/3648 |
| | | | | 345/101 |
| 2014/0347774 | A1* | 11/2014 | Uehara | H02H 3/0935 |
| | | | | 361/87 |

FOREIGN PATENT DOCUMENTS

| | | | |
|---|---|---|---|
| JP | 7-229577 A | | 8/1995 |
| JP | 2007-278275 A | | 10/2007 |
| JP | 2007278275 A | * | 10/2007 |

\* cited by examiner

VALVE DEVICE

TECHNICAL FIELD

The present invention relates to a valve device which controls a flow rate of fluid.

BACKGROUND ART

For example, it is conventionally known that control of a valve device is performed by feedback control like a current control type solenoid valve disclosed in Patent Literature 1.

The valve device includes an actuator unit including a motor or the like. The actuator unit is formed of various parts, and there is a weak part, for example, at a connecting part between the parts. Especially, in a case where the valve device is configured to close in a state in which the actuator unit and a valve are connected to each other, impact generated by contact of the valve with a valve seat at the time of closing the valve is directly transmitted from the valve to the actuator unit. For this reason, it is necessary to pay attention to the weak part in the actuator unit.

CITATION LIST

Patent Literature

Patent Literature 1: JP 7-229577 A

SUMMARY OF INVENTION

Technical Problem

For example, as temperature of grease of a motor in the actuator unit increases, viscosity thereof decreases. Thus, in a case where the valve device is controlled with a control constant, which is used in feedback control, fixed to the same value under any temperature environment, resistance of the grease to rotation of the motor decreases under a higher temperature environment, and a moving speed of the valve increases. As a result, the impact at the time of closing the valve becomes greater under the higher temperature environment, and the impact is transmitted to the actuator unit, which might lead to damage of the actuator unit. On the other hand, in a case where the control constant used in the feedback control is fixed to a value which can suppress the impact at the time of closing the valve under a high temperature environment, in which the viscosity of the grease is low, to an allowable value or less, the moving speed of the valve unnecessarily decreases under a low temperature environment, in which the viscosity of the grease is high. That is, a response speed of the actuator unit, which is synonymous with time required for an output shaft of the actuator unit to rotate to a target position, under the low temperature environment is lower than that under the high temperature environment.

The present invention is achieved to solve the above problem, and an object thereof is to obtain a valve device controlled to suppress impact at the time of closing a valve without decreasing a response speed of an actuator unit even under a varying temperature environment.

Solution to Problem

A valve device according to the present invention is provided with an actuator that includes components fixed to each other, a valve to open and close a fluid passage by driving force of the actuator, a connector that connects an output shaft of the actuator and the valve, and a controller to control the actuator by feedback control, in which the controller determines a control constant used in the feedback control to be a value by which current supplied to generate the driving force is smaller as ambient temperature is higher and a width of a temperature section having a same control constant is narrower as temperature is higher.

Advantageous Effects of Invention

According to the present invention, the control unit determines a control constant used in the feedback control to be a value by which a response speed of an actuator unit is smaller as ambient temperature is higher. Thus, it is possible to obtain the valve device controlled so as to suppress impact at the time of closing the valve without decreasing the response speed of the actuator unit even under a varying temperature environment.

DESCRIPTION OF EMBODIMENTS

An embodiment for carrying out the present invention is hereinafter described with reference to the attached drawings in order to describe the present invention in more detail.

First Embodiment

Figure 1:
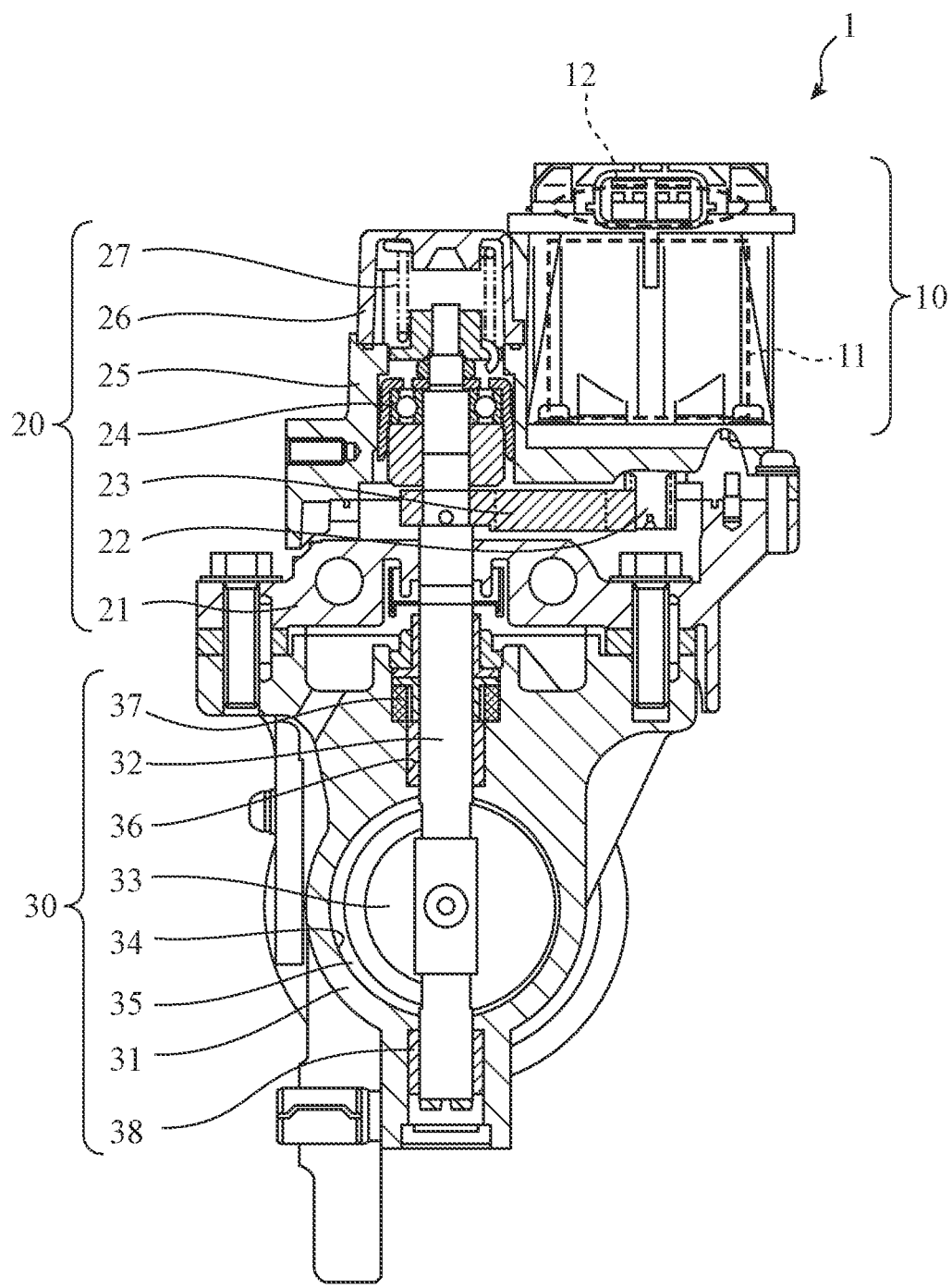
FIG. 1 is a partial cross-sectional view illustrating a valve device according to a first embodiment of the present invention.

FIG. 1 is a partial cross-sectional view illustrating a valve device 1 according to a first embodiment of the present invention. FIG. 1 illustrates a case where the valve device 1 is used as an exhaust gas recirculating valve (hereinafter referred to as EGR valve) which returns exhaust gas of an engine to an intake passage.

The valve device 1 is a valve device of a type referred to as a butterfly type. The valve device 1 includes an actuator unit 10 which generates rotational driving force for opening and closing a valve, a gear unit 20 which transmits the driving force of the actuator unit 10 to a shaft 32, and a valve unit 30 which opens and closes a fluid passage 34 through which the exhaust gas flows with a valve 33 to control a flow rate of fluid.

The actuator unit 10 includes a motor 11, and one end side of an output shaft of the motor 11 serves as a pinion gear 22 extending inside a gear box 21. The pinion gear 22 meshes with a gear 23. The shaft 32 fixed to an inner race of a bearing 24 to be rotatably supported is fixed to the gear 23. The valve 33 is fixed to the shaft 32.

When the motor 11 works, the pinion gear 22 rotates to rotate the gear 23. The driving force of the motor 11 is transmitted to the shaft 32 via the pinion gear 22 and the gear 23. The shaft 32 rotates as the driving force of the motor 11 is transmitted thereto, and the valve 33 fixed to the shaft 32 also rotates together.

The illustrated gear 23 has a circular sector shape in a plan view and meshes with the pinion gear 22 by a meshing groove arranged in an arc shape. However, it is also possible to fix a gear having a circular shape in a plan view to the shaft 32 instead of the gear 23 and connect the gear with the pinion gear 22 by any number of gears each having a circular shape in a plan view. This configuration may be used to transmit the driving force of the motor 11 to the shaft 32. In short, each gear provided between the valve 33 and the actuator unit 10 may be any gear which is in a state of meshing to be connected.

A housing of the gear unit 20 is formed of the gear box 21 and a gear cover 25. A spring holder 26 is attached to the gear cover 25, and a return spring 27 is arranged on an upper end side of the shaft 32. The return spring 27 serves as a fail-safe and biases the shaft 32 in a direction of rotation in which the valve 33 returns to a closed position where the valve 33 is brought into contact with a valve seat 35. An upper end side is the side on which the actuator unit 10 and the gear unit 20 are located as seen from the valve unit 30. The actuator unit 10 is attached to the gear cover 25 as illustrated.

A through hole 36 through which the fluid passage 34 communicates with the outside is formed in a valve unit housing 31. The shaft 32 is inserted into the through hole 36. A filter 37 is provided on an upper end side of the through hole 36, and a bush 38 is provided on a lower end side thereof. The upper end side of the shaft 32 is supported by the bearing 24, and a lower end side thereof is supported by the bush 38. On an inner surface of the fluid passage 34 having a cylindrical shape, the valve seat 35 is provided.

By working of the motor 11, the valve 33 rotates integrally with the shaft 32 as described above, and a gap between the valve 33 and the valve seat 35 is changed, so that the flow rate of the fluid is controlled.

Figure 2:
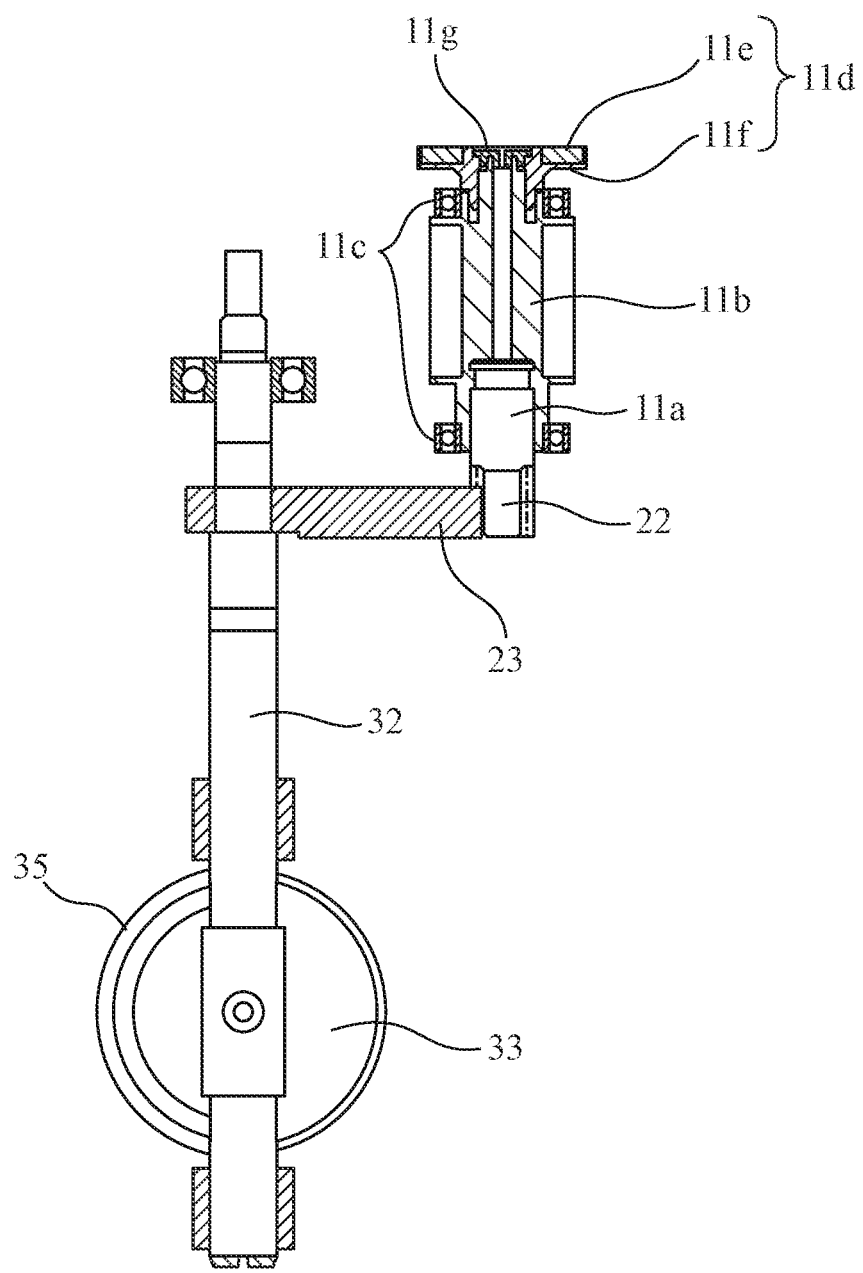
FIG. 2 is a cross-sectional view illustrating a part of the valve device according to the first embodiment of the present invention.

FIG. 2 is a cross-sectional view illustrating a part of the valve device 1. Specifically, FIG. 2 illustrates a part from the valve seat 35 and the valve 33, which is brought into contact with or gets away from the valve seat 35, to the motor 11 of the actuator unit 10.

The valve 33 is fixed to the shaft 32 by press-fitting of a pin, caulking, screwing or the like. The shaft 32 is press-fitted to be fixed to the gear 23, for example. The gear 23 is installed in a state of meshing with the pinion gear 22. The pinion gear 22 is formed on one end side of an output shaft 11a of the motor 11, and the output shaft 11a is fixed to a rotor 11b by, for example, insert molding or the like. The motor 11 includes the output shaft 11a, the rotor 11b, bearings 11c, a magnet unit 11d and the like.

The rotor 11b to which the output shaft 11a is fixed is rotatably supported by the bearings 11c. The magnet unit 11d is obtained by fixing a magnet 11e to a base 11f by insert molding or the like. The magnet 11e is a magnet for detecting a magnetic pole position and is provided on a surface perpendicular to a rotation axis of the rotor 11b.

The rotor 11b and the magnet unit 11d are fixed to each other by a lid 11g being welded to both the rotor 11b and the magnet unit 11d. Meanwhile, the rotor 11b and the magnet unit 11d may be fixed by a method other than welding; in the present invention, various fixing methods of parts such as welding are collectively referred to as fixing.

The motor 11 also includes a stator or the like as is well known, though it is not illustrated.

As illustrated in FIG. 2, in a case where the valve device 1 is configured to close in a state in which parts from the valve 33 to the output shaft 11a of the motor 11 are connected to one another to form a connecting unit, impact generated by contact of the valve 33 with the valve seat 35 at the time of closing the valve 33 is directly transmitted from the valve 33 to the motor 11. In the motor 11, connecting parts between the parts illustrated in FIG. 2, especially a part where the rotor 11b and the magnet unit 11d are welded to be fixed to the lid 11g is weak. Thus, this part is easily damaged by the impact at the time of closing the valve 33, which leads to breakdown of the valve device 1. Specifically, the connecting unit includes the shaft 32 and the gear 23 which connect the valve 33 to the output shaft 11a.

The valve device 1 has a mechanism as described above, and a control unit, which is not illustrated, controls current supplied to the motor 11 to control working of the motor 11, controlling opening and closing operation of the valve device 1. At that time, the control unit performs feedback control. The control unit formed of, for example, a microcontroller is mounted on a substrate 12 facing the motor 11 as illustrated in FIG. 1 to be built in the actuator unit 10. In addition, a Hall integrated circuit (IC), which is not illustrated, is mounted on the substrate 12 in a position facing the magnet 11e.

The control by the control unit is next described with reference to a conceptual view of the control illustrated in FIG. 3.

The control unit obtains ambient temperature T of the motor 11 using a detection signal output from a temperature sensor which is not illustrated. Then, the control unit selects a control constant used in the feedback control on the basis of the obtained ambient temperature T to determine. As illustrated in FIG. 3, the control constant corresponding to the ambient temperature T is set in advance to be stored in a storage unit which is not illustrated, and the control unit selects the control constant to be used by accessing the storage unit.

For example, in a case where the ambient temperature T is equal to or lower than T1, the control unit selects a control constant A1 as a corresponding control constant and performs the feedback control using the control constant A1.

Also, for example, in a case where the ambient temperature T is higher than T1 and equal to or lower than T2, the control unit selects a control constant A2 as the corresponding control constant and performs the feedback control using the control constant A2.

Also, for example, in a case where the ambient temperature T is higher than T2 and equal to or lower than T3, the control unit selects a control constant A3 as the corresponding control constant and performs the feedback control using the control constant A3.

Also, for example, in a case where the ambient temperature T is higher than T3, the control unit selects a control constant A4 as the corresponding control constant and performs the feedback control using the control constant A4.

Figure 3:
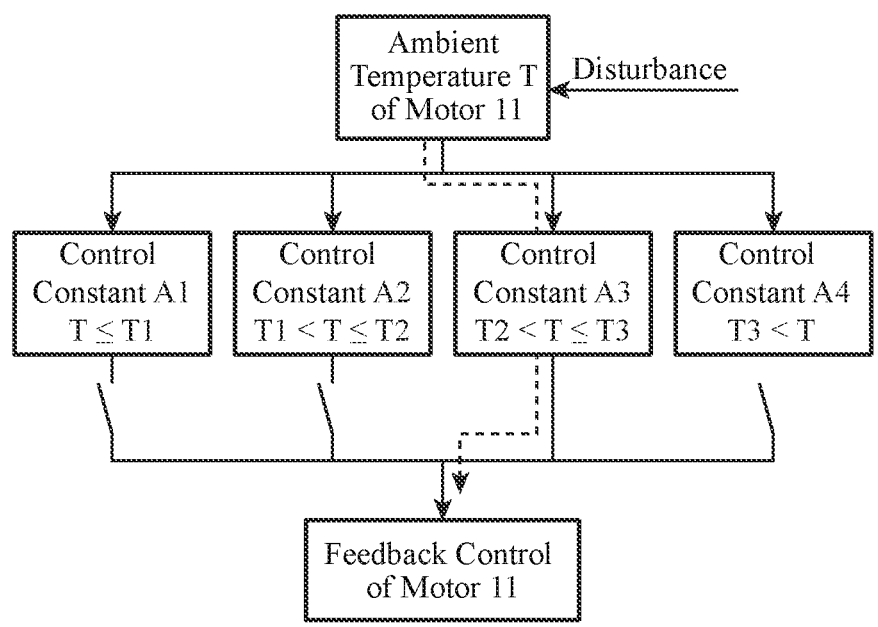
FIG. 3 is a view illustrating a concept of control of the valve device according to the first embodiment of the present invention.

In FIG. 3, a case where the ambient temperature T is higher than T2 and equal to or lower than T3 and the control constant A3 is selected is indicated by a broken line.

In a case where the valve device 1 is placed under the same environment, a response speed of the actuator unit 10 which results from the control using the control constant A2 is lower than that which results from the control using the control constant A1. The control constants A1 and A2 are in such relationship. Similarly, in a case where the valve device 1 is placed under the same environment, the response speed of the actuator unit 10 which results from the control using the control constant A3 is lower than that which results from the control using the control constant A2. The control constants A2 and A3 are in such relationship. Similarly, in a case where the valve device 1 is placed under the same environment, the response speed of the actuator unit 10 which results from the control using the control constant A4 is lower than that which results from the control using the control constant A3. The control constants A3 and A4 are in such relationship.

That is, the control unit determines the control constant to be a value by which the response speed of the actuator unit 10 is smaller as the obtained ambient temperature T of the motor 11 is higher, and performs the feedback control.

When the ambient temperature T is high, viscosity of grease of the bearing 11*c* in the motor 11 decreases, so that even when the same amount of current is supplied to the motor 11, a rotational speed of the valve 33 is higher than that in a case where the ambient temperature T is low. That is, the response speed of the actuator unit 10, which is synonymous with time required for the output shaft 11*a* of the actuator unit 10 to rotate to a target position, increases. Thus, the higher the ambient temperature T, the greater the impact at the time of closing the valve 33 transmitted to a fixed part, which is weak, between the rotor 11*b* and the magnet unit 11*d*.

Thus, the control unit of the valve device 1 determines the control constant to be the value by which the response speed of the actuator unit 10 is smaller as the ambient temperature T is higher, thereby canceling an increase in the rotational speed of the valve 33 due to a decrease in viscosity of the grease. Thus, the valve 33 is brought into contact with the valve seat 35 at a predetermined speed or lower when the valve is closed. As a result, even when the ambient temperature T is high, the impact at the time of closing the valve 33 is prevented from increasing.

The above-described predetermined speed is a speed appropriately set by testing of an actual device or the like such that the impact transmitted to the fixed part between the rotor 11*b* and the magnet unit 11*d* is such a value that the fixed part is not damaged.

For example, in a case where the control unit adopts P control in which proportional control is performed as the feedback control, a proportional constant is determined to be a smaller value as the ambient temperature T is higher. The proportional constant is also referred to as proportional gain.

Also, for example, in a case where the control unit adopts PI control in which the proportional control and integral control are performed as the feedback control, the proportional constant is determined to be a smaller value as the ambient temperature T is higher, and an integral constant is determined to be a larger value as the ambient temperature T is higher. The integral constant is also referred to as integral time.

As a result, as the ambient temperature T is higher, the current supplied to the motor 11 is smaller whereas the viscosity of the grease of the motor 11 decreases, and as the ambient temperature T is lower, the current supplied to the motor 11 is larger whereas the viscosity of the grease of the motor 11 increases. Thus, the response speed of the actuator unit 10 is substantially similar irrespective of the value of the ambient temperature T. Thus, the response speed of the actuator unit 10 is not decreased while the impact at the time of closing the valve 33 is suppressed.

The temperature sensor may also directly detect temperature other than the ambient temperature T of the motor 11. The configuration in which the temperature sensor detects the ambient temperature T of the motor 11 is based on the fact that the ambient temperature T has a positive correlation with the temperature of the grease of the motor 11. Since it is often difficult to directly measure the temperature of the grease of the motor 11, an example in which the ambient temperature T of the motor 11 is detected by the temperature sensor is herein described.

There is no limitation; since the ambient temperature T also has a positive correlation with temperature in various parts inside the valve device 1 and around the same, the temperature sensor may be provided in any part and the control unit may determine the control constant on the basis of the temperature detected by the temperature sensor. For example, it is conceivable that the temperature sensor is a thermistor that is mounted on the substrate 12 together with the control unit which is a microcontroller and detects temperature of the microcontroller. The temperature of the microcontroller also has positive correlation with the ambient temperature T and the temperature of the grease of the motor 11. For example, when the temperature of the microcontroller exceeds 80 degrees C., the temperature of the grease of the motor 11 is such that the viscosity decreases, and the control unit starts applying a process of determining the control constant depending on the temperature.

In short, ambient temperature which is used when the control unit determines the control constant may be any temperature from which the temperature of the grease of the motor 11 can be obtained substantially, and the control unit may be any control unit which substantially perform the control of determining the control constant depending on the temperature of the grease of the motor 11.

Also, although FIG. 3 illustrates the case where a range of the ambient temperature T is divided into four temperature sections and the control constants A1 to A4 are associated with respective temperature sections, the division number of the range of the ambient temperature T may be freely selected. As the division number increases, the control is achieved reflecting the ambient temperature T more finely. In contrast, as the division number decreases, the control may be made simpler.

Figure 4:
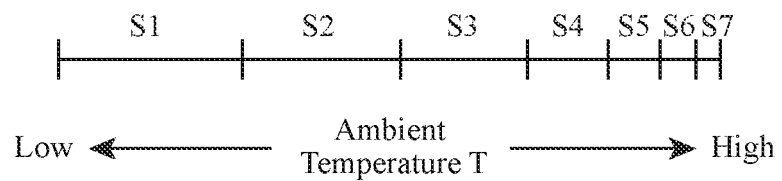
FIG. 4 is a view illustrating a concept of control of the valve device according to the first embodiment of the present invention.

Also, as illustrated in FIG. 4, the ambient temperature T and the control constant may be associated with each other such that a width of the temperature section having the same control constant becomes narrower as the temperature increases. Each of temperature sections S1 to S7 in FIG. 4 represents a section in which the feedback control is performed using the same control constant. As a result, the control unit performs the control to determine the control constant by narrowing the width of the temperature section having the same control constant as the temperature is higher. By doing so, it becomes possible to control the valve device 1 with high precision under a high temperature environment. Especially, in a case where the valve device 1 is the EGR valve, the valve device 1 often operates under an environment in which the temperature of the microcontroller forming the control unit is around 115 degrees C. It is preferable to make the width of the temperature section having the same control constant narrow especially around the temperature at which the operation is often done.

Also, at that time, the control unit may adopt PID control to perform the proportional control, the integral control, and differential control as the feedback control and determine a differential constant to be a larger value as the ambient temperature T is higher. Since chattering of the valve 33 is more likely to occur under a higher temperature environment, the differential constant is increased to suppress the chattering. The differential constant is also referred to as differential time.

Also, although the case where the valve device 1 is used as the EGR valve is described above, the valve device 1 may also be used as a valve device other than the EGR valve. For example, the valve device 1 may be used as a valve device placed under a varying temperature environment, such as a wastegate valve, a valve for flow rate control in a variable geometry (VG) turbo or the like.

In the description above, the valve device 1 is described as the butterfly type valve device. However, the valve device 1 may be any valve device other than the butterfly type as long as it is configured such that the output shaft 11a of the motor 11, that is, the output shaft of the actuator unit 10 and the valve 33 are in the state connected to each other at least when the valve 33 is closed.

As described above, according to the valve device 1 according to the first embodiment, as the ambient temperature T of the motor 11 is higher, the control unit of the valve device 1 determines the control constant to be the value by which the response speed of the actuator unit 10 is smaller and performs the feedback control. As a result, even under the varying temperature environment, it is possible to suppress the impact at the time of closing the valve without decreasing the response speed of the actuator unit 10.

Also, the control unit determines the control constant by narrowing the width of the temperature section having the same control constant as the temperature is higher. By doing so, it becomes possible to control the valve device 1 with high precision under a high temperature environment.

Also, the control unit performs the control including the differential control as the feedback control and determines the differential constant used in the control to be the larger value as the ambient temperature is higher. In this manner, it is possible to suppress the chattering.

Also, the valve device 1 is the butterfly valve which opens and closes the fluid passage 34 by rotating of the valve 33. In this manner, the valve device 1 may be provided and used at a part where it is preferable to provide the butterfly type valve device.

Also, the valve device 1 is the EGR valve. That is, the valve device 1 may be used as the EGR valve.

Also, the control unit is built in the actuator unit 10. By doing so, the thermistor may be provided on the substrate 12 placed near the motor 11 and on which the control unit is mounted. Thus, the temperature of a part having a strong correlation with the temperature of the grease of the motor 11 may be easily used for the control.

In the invention of the present application, any component of the embodiment may be modified, or any component of the embodiment may be omitted within the scope of the invention.

INDUSTRIAL APPLICABILITY

As described above, the valve device according to the present invention is controlled so as to suppress the impact at the time of closing the valve without decreasing the response speed of the actuator unit even under the varying temperature environment. Thus, the valve device is suitable for use as the EGR valve, for example.

REFERENCE SIGNS LIST

1: Valve device, 10: Actuator unit, 11: Motor, 11a: Output shaft, 11b: Rotor, 11c: Bearing, 11d: Magnet unit, 11e: Magnet, 11f: Base, 11g: Lid, 12: Substrate, 20: Gear unit, 21: Gear box, 22: Pinion gear, 23: Gear, 24: Bearing, 25: Gear cover, 26: Spring holder, 27: Return spring, 30: Valve unit, 31: Valve unit housing, 32: Shaft, 33: Valve, 34: Fluid passage, 35: Valve seat, 36: Through hole, 37: Filter, 38: Bush

The invention claimed is:

1. A valve device comprising:
an actuator that includes components fixed to each other;
a valve to open and close a fluid passage by driving force of the actuator;
a connector that connects an output shaft of the actuator and the valve; and
a controller to control the actuator by feedback control,
wherein the controller determines a control constant used in the feedback control to be a value by which current supplied to generate the driving force is smaller as ambient temperature is higher, and
a width of a temperature section having a same control constant is narrower as temperature is higher, the temperature section being set in advance in a memory.

2. The valve device according to claim 1,
wherein the controller performs control including differential control as the feedback control and determines a differential constant used in the control to be a larger value as the ambient temperature is higher.

3. The valve device according to claim 1,
being a butterfly valve to open and close the fluid passage by rotating the valve.

4. The valve device according to claim 1,
being an exhaust gas recirculating valve.

5. The valve device according to claim 1,
wherein the controller is built in the actuator.

* * * * *